C. A. NAYLOR.
SULKY HARROW ATTACHMENT.
APPLICATION FILED JULY 3, 1912.
1,065,711.
Patented June 24, 1913.
3 SHEETS—SHEET 1.
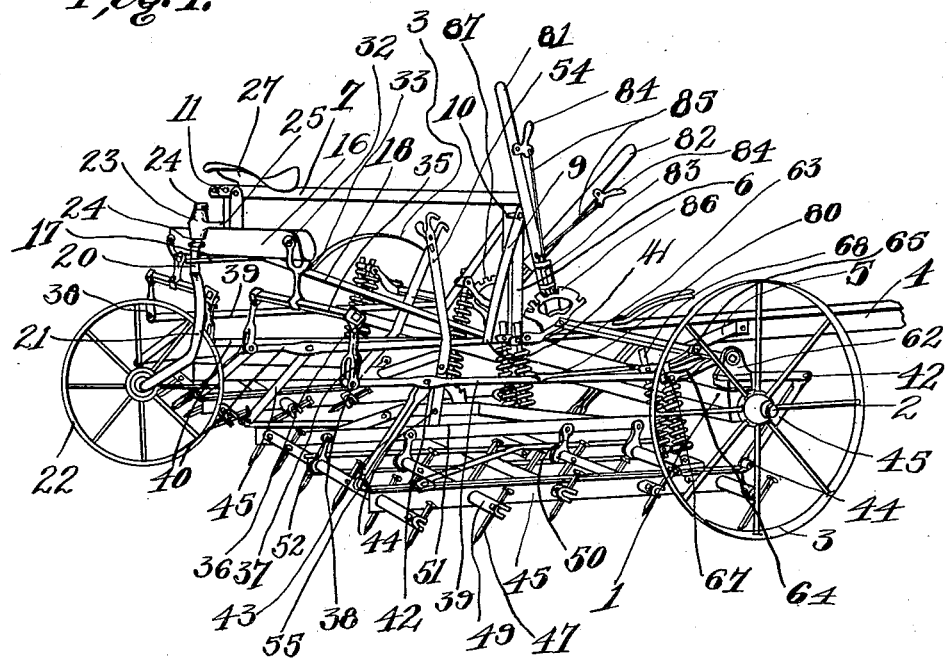
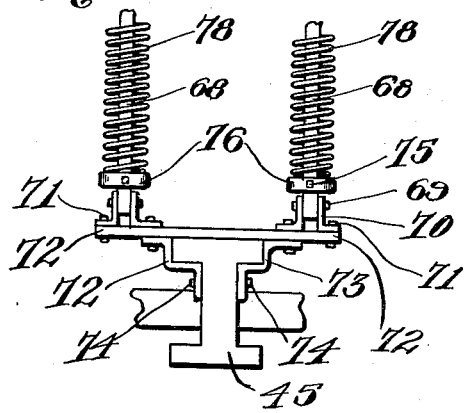
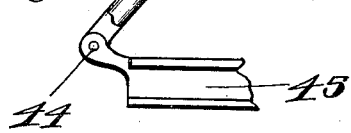
Witnesses
Rohe Meyer.
Francis T. Boswell
Inventor
C. A. Naylor.
By D. Swift & Co.
Attorneys C. A. NAYLOR.
SULKY HARROW ATTACHMENT.
APPLICATION FILED JULY 3, 1912.
1,065,711.
Patented June 24, 1913.
3 SHEETS—SHEET 2.
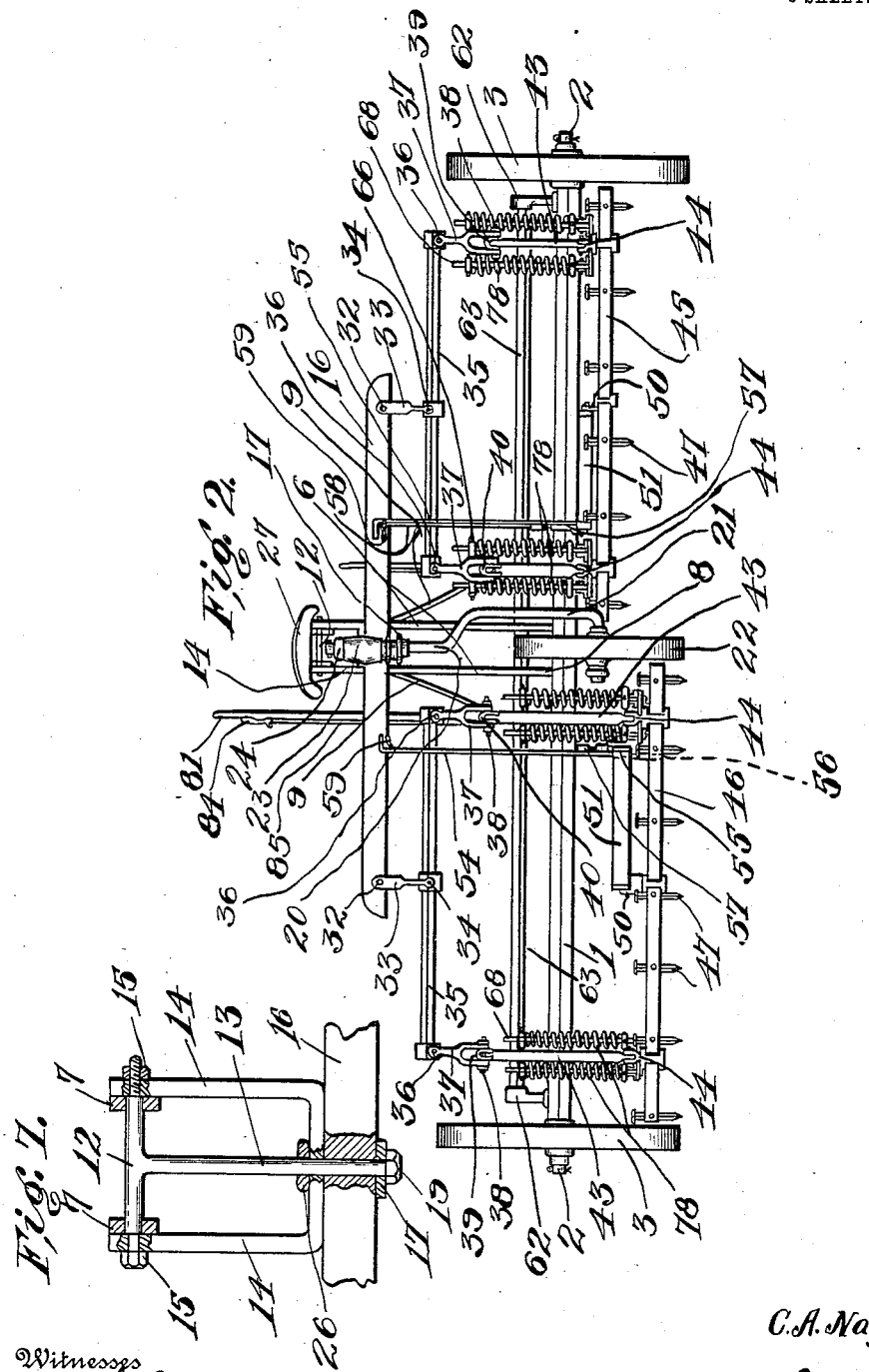
Witnesses
Rohe Meyer.
Francis G. Boswell
Inventor
C. A. Naylor
By D. Swift & Co.
Attorneys

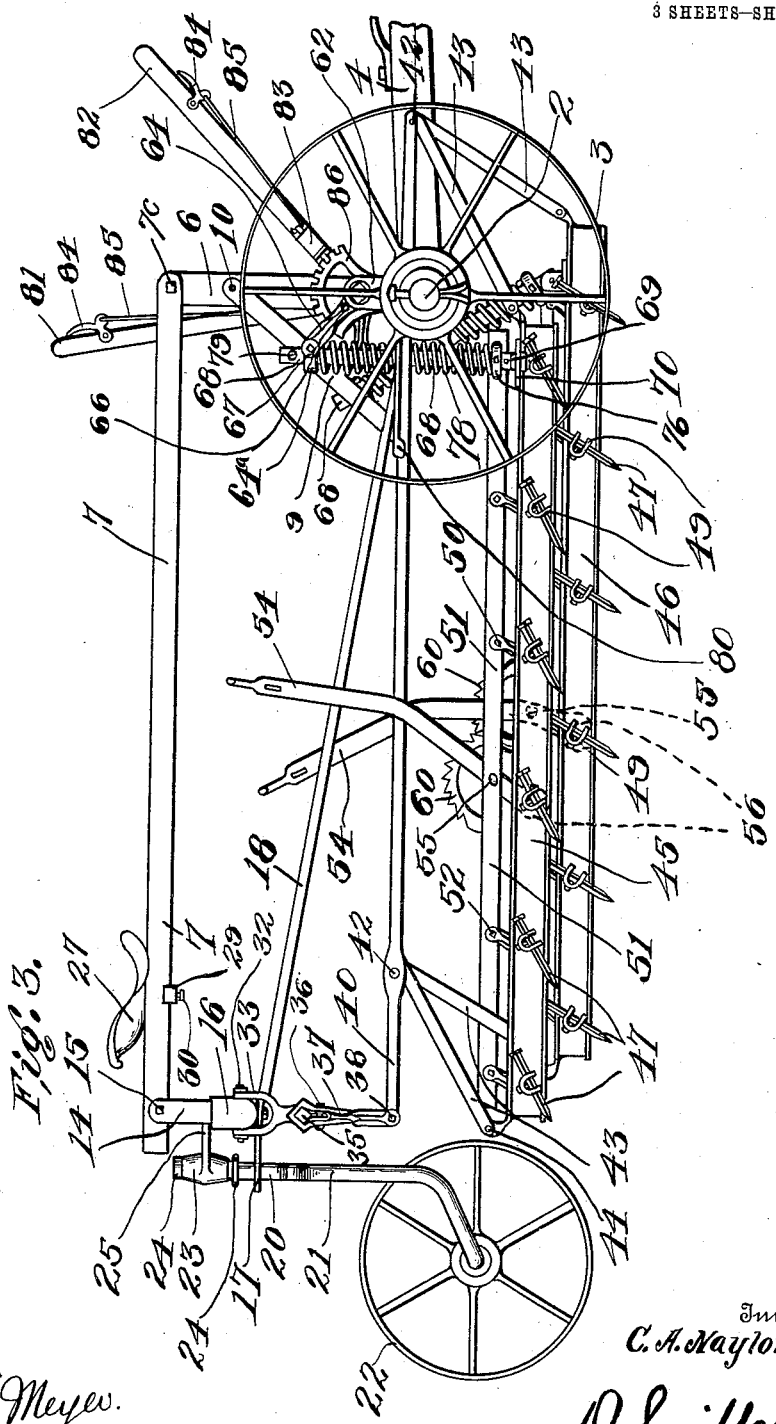

UNITED STATES PATENT OFFICE.

CHARLES AUGUSTUS NAYLOR, OF JENNINGS, LOUISIANA.

SULKY-HARROW ATTACHMENT.

1,065,711.  Specification of Letters Patent.  Patented June 24, 1913.

Application filed July 3, 1912. Serial No. 707,531.

*To all whom it may concern:*

Be it known that I, CHARLES A. NAYLOR, a citizen of the United States, residing at Jennings, in the parish of Calcasieu and State of Louisiana, have invented a new and useful Sulky-Harrow Attachment; and I do hereby declare the following to be a full, clear, and exact description of the invention, such as will enable others skilled in the art to which it appertains to make and use the same.

This invention relates to a sulky harrow, and particularly to a new and useful attachment therefor.

One of the objects of the invention is to provide an attachment for sulky harrow comprising means for raising and lowering one or the other, or both, simultaneously of the frames carrying the harrow teeth.

Another object of the invention is to raise such frames bodily and substantially in a horizontal plane.

As another object of the invention, it is the aim, to provide a sliding seat, so that the weight of the operator may be shifted forwardly or rearwardly of the machine, so as to increase or decrease the depth of the harrow teeth in the ground or soil.

It is another object of the invention to relieve the draft animals of the dead weight.

By the provision of the slidable seat, the operator may maintain absolute or complete control of the harrow, without burdening the draft animals with extra weight.

Owing to the frame, which carries the seat, being vertically movable relative to the rear wheel, the operator may gage the depth of the harrow teeth, and maintain the level of the frames carrying the teeth, according to the various soils or conditions thereof.

By the provision of means for raising and lowering the frames carrying the teeth, another object is afforded. For instance, it affords a convenient and easy way of traversing the machine from one point to another, particularly along roadways, thereby lessening the danger of breakage, by the teeth or other parts coming in contact with obstacles.

In the drawings there is disclosed one form only of the invention, but in practical fields this form may necessitate alterations, to which the patentee is entitled, provided the alterations are comprehended within the scope of what is claimed.

The invention comprises further features and combination of parts, as hereinafter set forth, shown in the drawings and claimed.

In the drawings:—Figure 1 is a view in perspective of a harrow, showing the improved attachment as applied thereto. Fig. 2 is a rear view, showing one of the frames carrying harrow teeth raised, and the other frame lowered. Fig. 3 is a side elevation of the harrow showing certain parts raised and lowered as shown in Fig. 2. Fig. 4 is a detail view showing how the forward suspending rods are connected to the frames carrying the harrow teeth. Fig. 5 is a detail view showing how the rear suspending rods are connected to the teeth carrying frames. Fig. 6 is a detail view of the sliding seat. Fig. 7 is a detail view, showing how the frame, which supports the seat may move vertically relative to the rear wheel of the harrow.

Referring to the drawings 1 designates an axle, which may be of any design or construction, and upon spindles 2 of which, the side wheels 3 are mounted. Connected to the axle is the draft tongue 4, which may be of any suitable construction or design, the same being braced by the braces 5.

Rising from substantially the central portion of the axle is a pair of vertical bars 6, which are spaced apart and arranged parallel to one another as shown. The bars 6 are connected by means of a bolt 7° to the horizontal bars 7, which are arranged parallel to one another.

The lower ends of the vertical bars 6 may be connected to the axle in any suitable manner, as shown at 8, and braced by the brace bars 9, the upper forward ends of which are connected to the bolt 10. The rear portions 11 of the horizontal bars 7 are held rigidly spaced apart by the T-portion 12 of the bolt 13, the vertical portion of which constitutes a guide. A U-shaped strap is connected to the rear ends of the horizontal bars 7 by the T-portion 12, there being nuts 15 threaded thereto to hold the parts in place. The vertical shank of the T-bolt 13 passes through the beam 16, and through a plate extension 17 of the spring brace rod 18, and is provided with a nut 19, thereby holding the beam 16 (which is braced by the spring rod 18, the lower forward end of which is secured in any suitable manner to the axle 1) secured to the U-shaped strap 14. Extending through the plate extension 17 is the vertical portion 20 of the rod 21, the lower end of which is provided with a wheel 22. The vertical portion 20 of the rod 21 also extends through a bearing 23 there being collars 24 secured to the vertical portion of the rod, one above and one below the bearings 23, thereby swiveling the rod in place. The bearing 23 is provided with a forwardly extending projection 25 having an eye 26 to receive the vertical guide portion of the T-bolt 13, which guide portion not only acts as a guide for the eye 26, but also constitutes means whereby the rear portions 11 of the horizontal bars 7 are guided relatively to the rod 21. In this manner it will be seen that as the operator's weight is applied on the rear of the horizonal bars 7, said rear portions of the bars and the beam 16 will yieldably move downwardly.

The seat 27 is provided with a projection 28 which extends between the horizontal bars 7, and to the lower portion of the projection 28 a plate 29 is secured by the bolt 30. This plate 29 overlaps the horizontal bars 7, in order to hold the seat in place. However, in this manner the seat may slide forwardly or rearwardly so that the operator may conveniently control the various adjustable parts of the machine.

Pivotally connected as at 32 to the ends of the beam 16 are links 33, which in turn are connected by the bolts 34 to the equalizing pressure bars 35. Connected by the bolts 36 to the ends of each bar 35 are links 37, the lower ends of which are pivoted at 38 to the rods 39 and 40. The lower rearward ends of the braces 9 are connected at 41 to the rods 40, thereby not only bracing the rods 40, but also bracing the bars 6. Pivoted at 42 in any suitable manner to the forward and rear ends of the rods 39 and 40 are the links 43, the lower ends of which are pivoted in any suitable manner as at 44 to two of the I-beams of each frame 45 and 46 carrying the teeth 47. The forward portions of the rods 39 rest upon the axle 1, as shown in Fig. 1. The harrow teeth 47 are carried by the partially revoluble rods 49, in the usual manner. Connected to the rods 49 by the arms 50 is an angular frame 51. The arms 50 are pivoted to this frame, as shown at 52. A pair of levers 54 pivoted at 55 to the lateral portions of the angular frames are provided. The lower ends of the levers 54 beyond the pivots 55 are rigidly connected at 56 to one of the revoluble rods 49 of each frame 45 and 46. These levers 54 are provided with the usual dogs 57 which are connected by a rod 58 to the usual hand grip 59, to engage the teeth of the racks 60, to hold the levers 54 in adjusted positions. In this manner the harrow teeth may be adjusted to various angles, to act better in the soil.

Mounted in bearings 62 of the axle 1 are rocking rods 63, to which the arms 64 are connected by the bolts 65. These arms 64 terminate in forked ends 66, between the forks of which collars 64$^a$ are swiveled by the bolts 67. Extending through the collars are the rods 68, the lower ends of which are pivoted at 69 between the plates 70, which are secured by the bolts 71 to the plates 72. These plates 72 are secured to two I-beams of each harrow teeth carrying frame by the angle plates 73. These plates 73 are secured to the I-beam by the bolts 74. Secured to the rods 68 by the set screws 75 are collars 76, between which and the collars 64$^a$ coil springs 78 are arranged on the rod 68. The upper extremities of the rods 68 are provided with transversely disposed pins 79, against which the collars 64$^a$ contact when the rods 63 are rocked, in order to raise the frames carrying the teeth. When the frames carrying the teeth are raised at their forward portions, the rear portions are correspondingly raised, owing to the link connections 43. When the said frames are lowered the springs 78 hold them yieldably in position relative to the soil. When the operator's weight is applied to the rear portions of the horizontal bars 7, the beam 16 will be forced downwardly, which in turn will press the rear portions of the frames carrying the teeth downwardly, and will distribute and equalize the pressure owing to the equalizing beams or bars 35.

The rods 39 are braced relative to the axle 1 by the bars 80.

To rock the rods 63 levers 81 and 82 are provided, having the usual dogs 83, which are connected to the hand grips 84 by the rods 85, so as to engage the teeth of the racks 86 and 87. In this manner the rods 63 are held in adjusted positions.

By means of the levers 81 and 82 and the compression springs 78, the teeth of the harrows are forced to yieldably contact with the ground, so as to cultivate the soil under various conditions, which would be otherwise impossible, if the machine was not equipped with these features. In other words when the levers 81 and 82 are moved rearwardly, the said springs are put under tension, thereby forcing the harrow teeth yieldably into the soil, and when the levers are moved in a reverse direction, the harrow frames, and the teeth as well, are yieldably raised.

From the foregoing it will be noted, there has been devised a novel and essential sulky harrow attachment, whereby the toothed frames may be bodily raised, singly or together, and when raised held in a substantially horizontal plane, and one which has been found desirable and practical.

The invention having been set forth, what is claimed as new and useful is:—

1. In a sulky harrow attachment, an axle, supporting wheels thereon, a frame including a rearwardly extending horizontally disposed portion and supported on the axle, a rear wheel having a substantially vertical rod relative to which the rear end of said horizontal portion of said frame is movable, a spring brace for yieldably supporting the rear end of said horizontal portion, a series of horizontal rods supported on the axle, a pair of toothed harrow frames suspended from said series of horizontal rods, connections between the rear ends of said series of horizontal rods and the rear end of said horizontal portion, and a seat slidable on said horizontal portion, adapted to be shifted forwardly or rearwardly, to increase or decrease the pressure upon the harrow frame.

2. In a sulky harrow attachment, an axle, supporting wheels thereon, a frame including a rearwardly extending horizontally disposed portion supported on the axle, the rear end of said horizontal portion having a guide, a rear wheel having a substantially vertical rod which is connected to said guide and relative to which vertical rod the rear end of said horizontal portion of said frame is movable, a spring brace for yieldably supporting the rear end of said horizontal portion, a series of horizontal rods supported on the axle, a pair of toothed harrow frames suspended from said series of horizontal rods, connections between the guide and the rear ends of said series of horizontal rods, and a seat slidable on said horizontal portion, adapted to be shifted forwardly or rearwardly, to increase or decrease the pressure upon the harrow frame.

3. In a sulky harrow attachment, an axle, supporting wheels thereon, a frame including a rearwardly extending horizontally disposed portion supported on the axle, the rear end of said horizontal portion having a guide, a rear wheel having a substantially vertical rod which is connected to said guide and relative to which vertical rod the rear end of said horizontal portion of said frame is movable, a spring brace for yieldably supporting the rear end of said horizontal portion, said spring brace terminating in an additional guide for said vertical rod, a series of horizontal rods supported on the axle, a pair of toothed harrow frames suspended from said series of horizontal rods, connections between the guide and the rear ends of said series of horizontal rods, and a seat slidable on said horizontal portion, adapted to be shifted forwardly or rearwardly, to increase or decrease the pressure upon the harrow frame.

4. In a sulky harrow attachment, an axle supporting wheels thereon, a frame including a rearwardly extending horizontally disposed portion and supported on the axle, a rear wheel having a substantially vertical rod relative to which the rear end of said horizontal portion of said frame is movable, a spring brace for yieldably supporting the rear end of said horizontal portion, a series of horizontal rods supported on the axle, a pair of toothed harrow frames adjustably swung from said series of horizontal rods, means for holding the harrow frames adjusted, connections between the rear ends of said series of horizontal rods and the rear end of said horizontal portion, and a seat slidable on said horizontal portion, adapted to be shifted forwardly or rearwardly, to increase or decrease the pressure upon the harrow frame.

5. In a sulky harrow attachment, an axle, supporting wheels thereon, a frame including a rearwardly extending horizontally disposed portion supported on the axle, the rear end of said horizontal portion having a guide, a rear wheel having a substantially vertical rod which is connected to said guide and relative to which vertical rod the rear end of said horizontal portion of said frame is movable, a spring brace for yieldably supporting the rear end of said horizontal portion, a series of horizontal rods supported on the axle, a pair of toothed harrow frames adjustably swung from said series of horizontal rods, means for holding said harrow frames adjusted, connections between the guide and the rear ends of said series of horizontal rods, and a seat slidable on said horizontal portion, adapted to be shifted forwardly or rearwardly, to increase or decrease the pressure upon the harrow frame.

6. In a sulky harrow attachment, an axle, supporting wheels thereon, a frame including a rearwardly extending horizontally disposed portion supported on the axle, the rear end of said horizontal portion having a guide, a rear wheel having a substantially vertical rod which is connected to said guide and relative to which vertical rod the rear end of said horizontal portion of said frame is movable, a spring brace for yieldably supporting the rear end of said horizontal portion, said spring brace terminating in an additional guide for said vertical rod, a series of horizontal rods supported on the axle, a pair of toothed harrow frames adjustably swung from said series of horizontal rods, means for holding said harrow frames adjusted, connections between the guide and the rear ends of said series of horizontal rods, and a seat slidable on said horizontal portion, adapted to be shifted forwardly or rearwardly, to increase or decrease the pressure upon the harrow frame.

In testimony whereof I have signed my name to this specification in the presence of two subscribing witnesses.

CHARLES AUGUSTUS NAYLOR.

Witnesses:
FRED BUCH,
J. G. IGLEHART.